T. M. AVERY.
BAG FOLDING MACHINE.
APPLICATION FILED FEB. 18, 1907.

935,729.

Patented Oct. 5, 1909.
8 SHEETS—SHEET 1.

Witnesses:
Wm. Geiger
H. W. Munday

Inventor:
True M. Avery
By Munday, Evarts, Adcock & Clarke
His Attorneys

T. M. AVERY.
BAG FOLDING MACHINE.
APPLICATION FILED FEB. 18, 1907.

935,729.

Patented Oct. 5, 1909.
8 SHEETS—SHEET 5.

Witnesses:
Wm. Geiger
H. W. Munday

Inventor:
True M. Avery
By Munday, Evarts, Adcock & Clarke.
His Attorneys

T. M. AVERY.
BAG FOLDING MACHINE.
APPLICATION FILED FEB. 18, 1907.
935,729.
Patented Oct. 5, 1909.
8 SHEETS—SHEET 6.
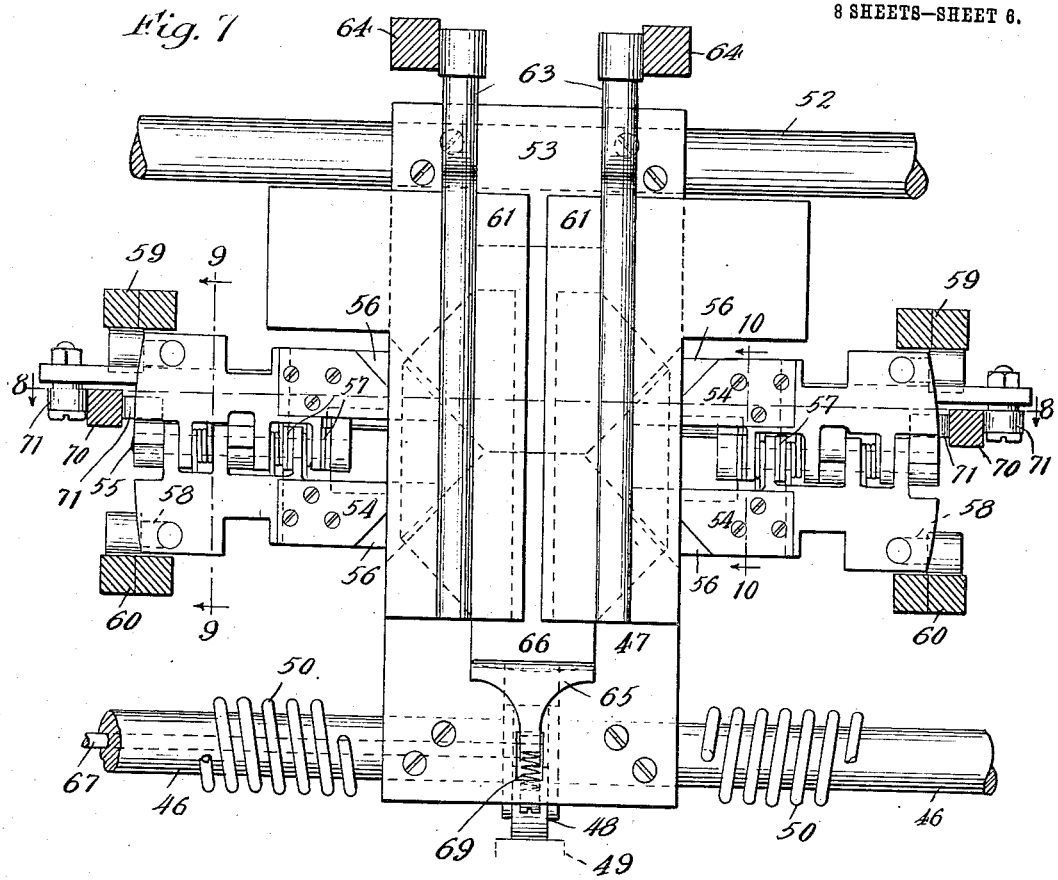
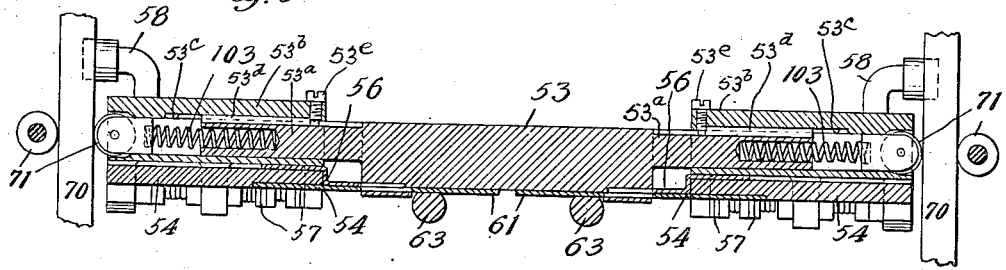
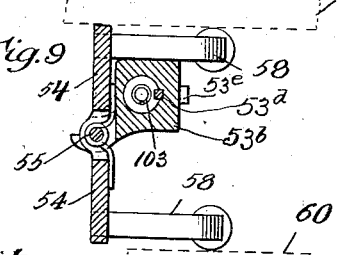
Witnesses:
Wm. Geiger
H. W. Munday
Inventor:
True M. Avery
By Munday, Evarts, Adcock & Clarke,
His Attorneys

T. M. AVERY.
BAG FOLDING MACHINE.
APPLICATION FILED FEB. 18, 1907.

935,729.

Patented Oct. 5, 1909.
8 SHEETS—SHEET 7.

Witnesses:
Wm. Geiger

Inventor:
True M. Avery
By Munday, Evarts, Adcock & Clarke.
His Attorneys

T. M. AVERY.
BAG FOLDING MACHINE.
APPLICATION FILED FEB. 18, 1907.
935,729.
Patented Oct. 5, 1909.
8 SHEETS—SHEET 8.
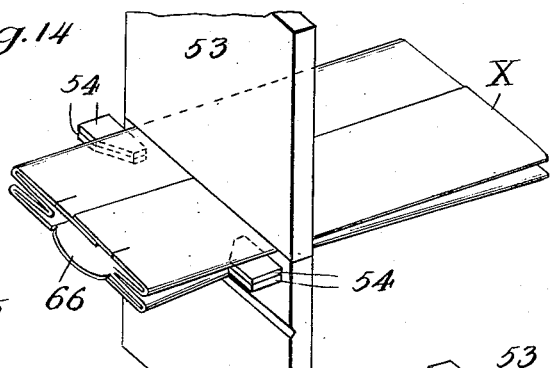
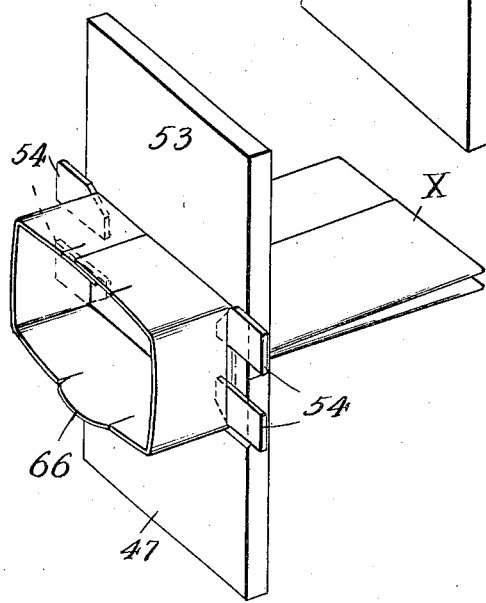
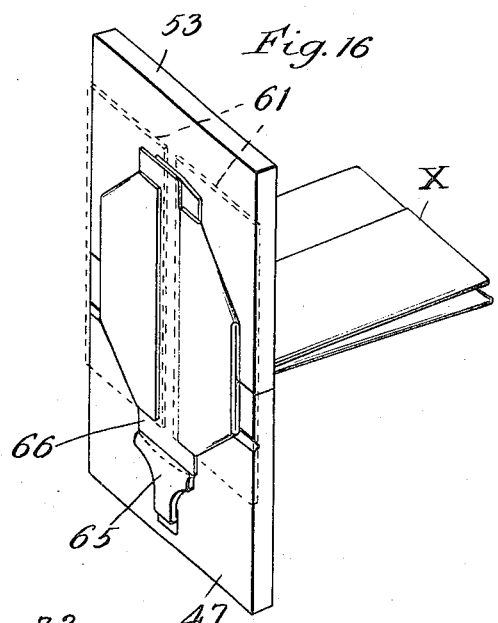
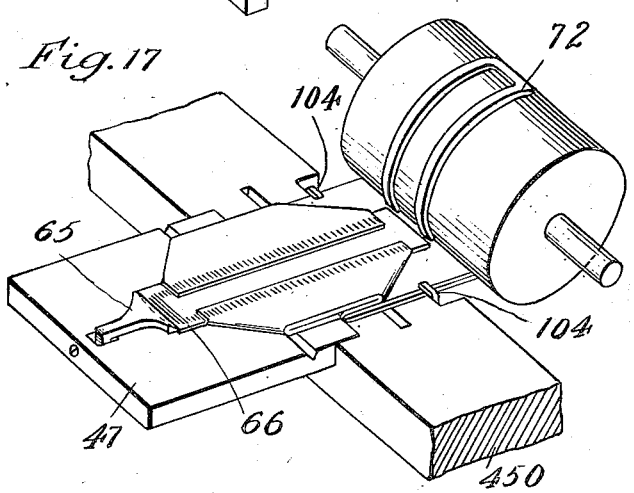
Witnesses:
Wm. Geiger
H. W. Munday
Inventor:
True M. Avery
By Munday, Evarts, Adcock & Clarke
His Attorneys

UNITED STATES PATENT OFFICE.

TRUE M. AVERY, OF OTTUMWA, IOWA, ASSIGNOR, BY MESNE ASSIGNMENTS, TO UNION PAPER BAG MACHINE COMPANY, OF PHILADELPHIA, PENNSYLVANIA, A CORPORATION OF PENNSYLVANIA.

BAG-FOLDING MACHINE.

935,729.     Specification of Letters Patent.     Patented Oct. 5, 1909.

Application filed February 18, 1907. Serial No. 357,846.

*To all whom it may concern:*

Be it known that I, TRUE M. AVERY, a citizen of the United States, residing in Ottumwa, in the county of Wapello and State of Iowa, have invented a new and useful Improvement in Bag-Folding Machines, of which the following is a specification.

This invention relates to machines for forming from paper tubing square bottom or self opening bags. My endeavor in the invention has been to devise a better construction of such machines than has been used before, and one which will be certain, unfailing and speedy in its action, so that its capacity will be increased from that of previous constructions, and which will be simple and little likely to get out of order.

A leading feature of the invention is found in the manner of supporting the folding devices. These devices are mounted upon endless chains or carriers and in such number as desired, and they may be arranged on the chains as close together as the length of the bags will permit so that no loss of time will occur between successive bags, and while they are operating on the bags they move forward in a straight horizontal path and at a uniform speed. The nature of my improvement by which these ends are attained, is fully disclosed in the subjoined description, and illustrated in the accompanying drawings forming a part of such description.

Figure 1:
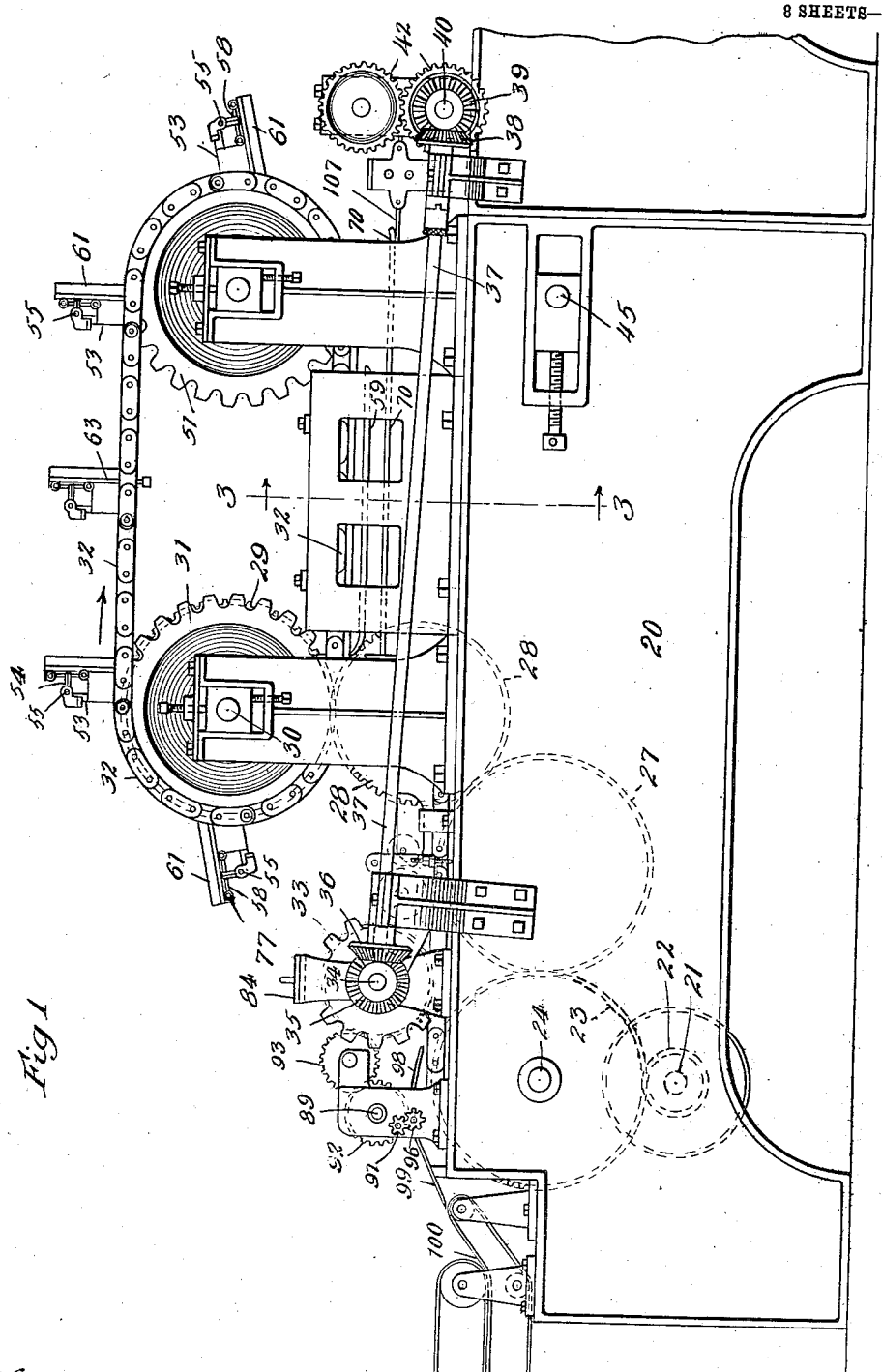
Figure 2:
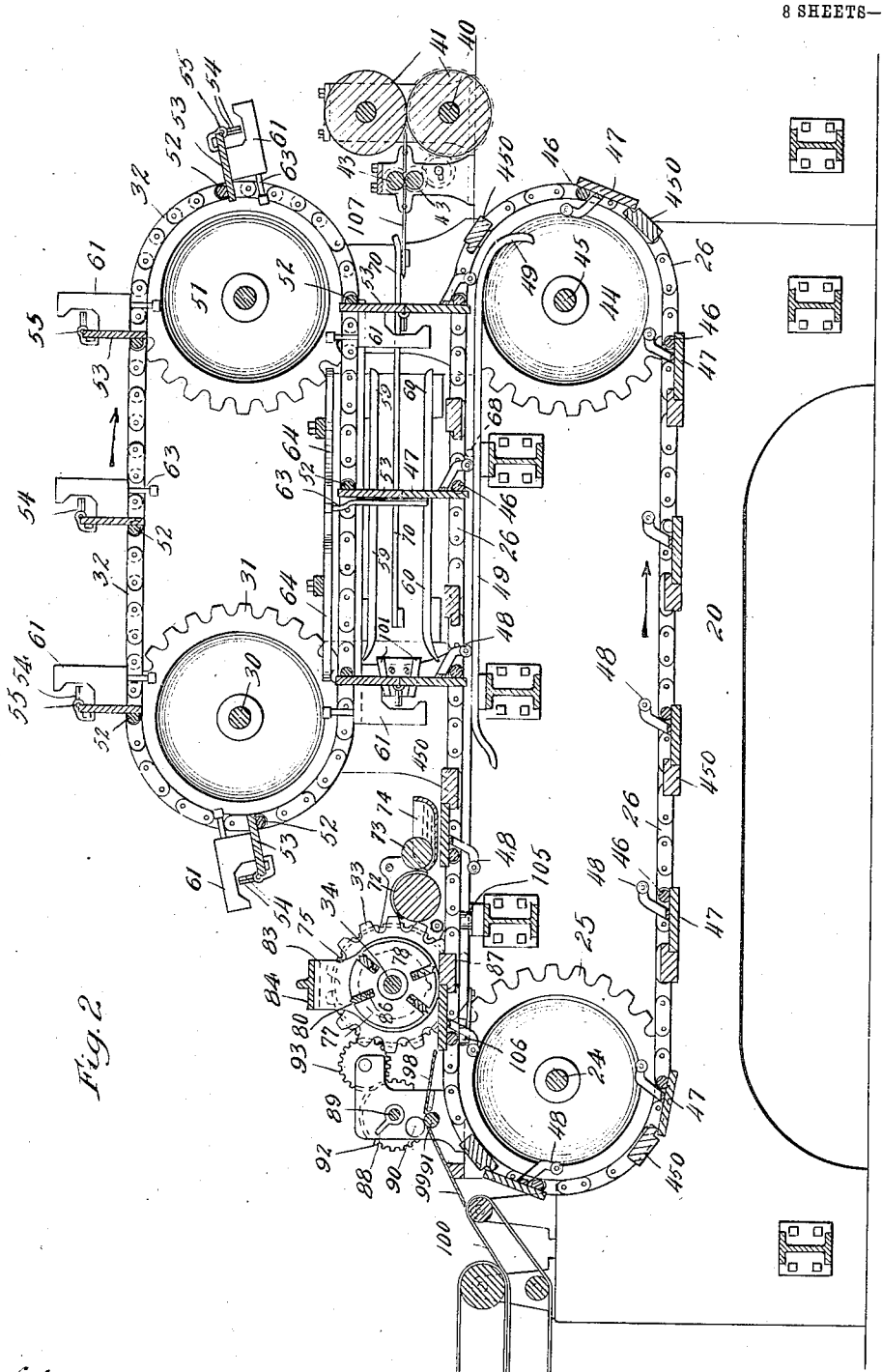
Figure 3:
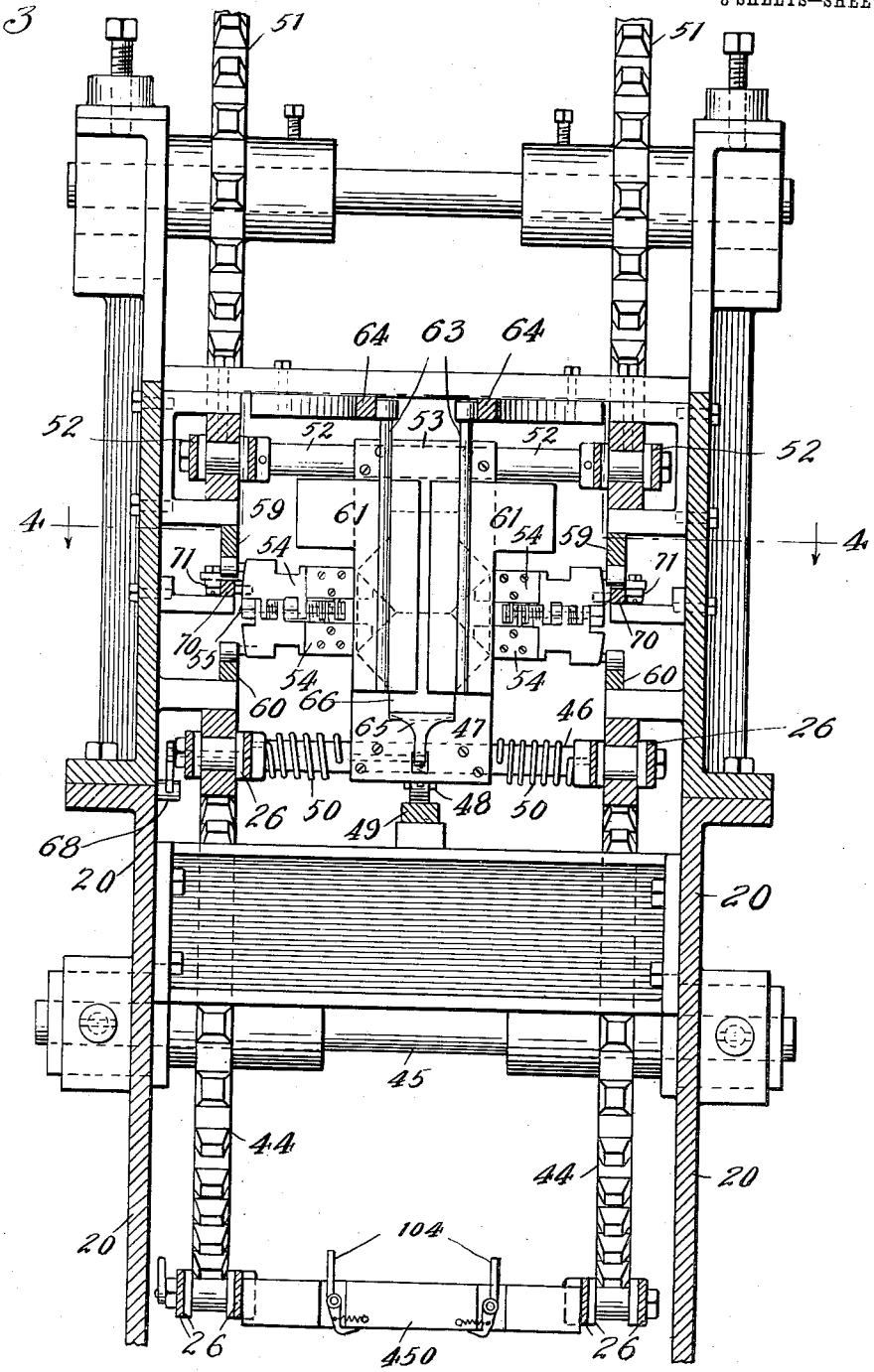
Figure 4:
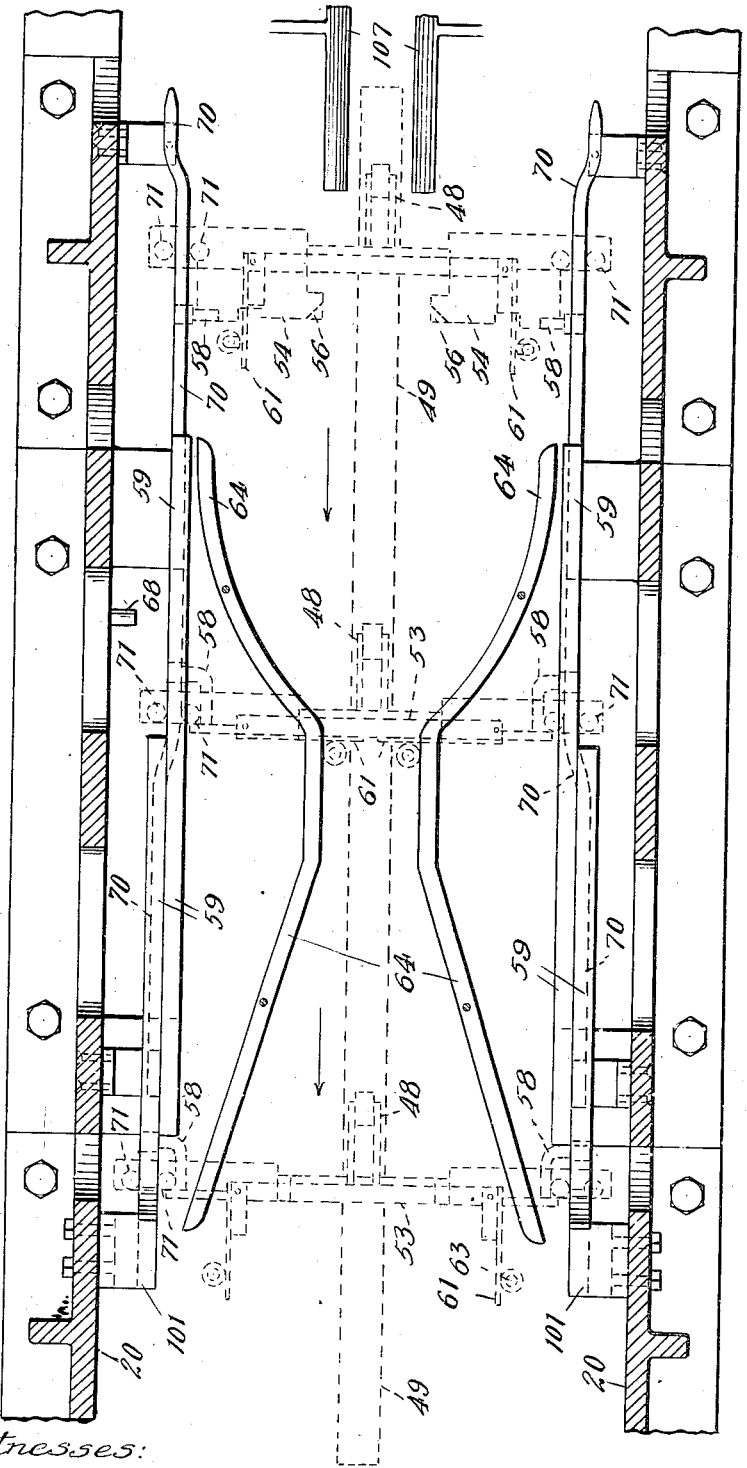
Figure 5:
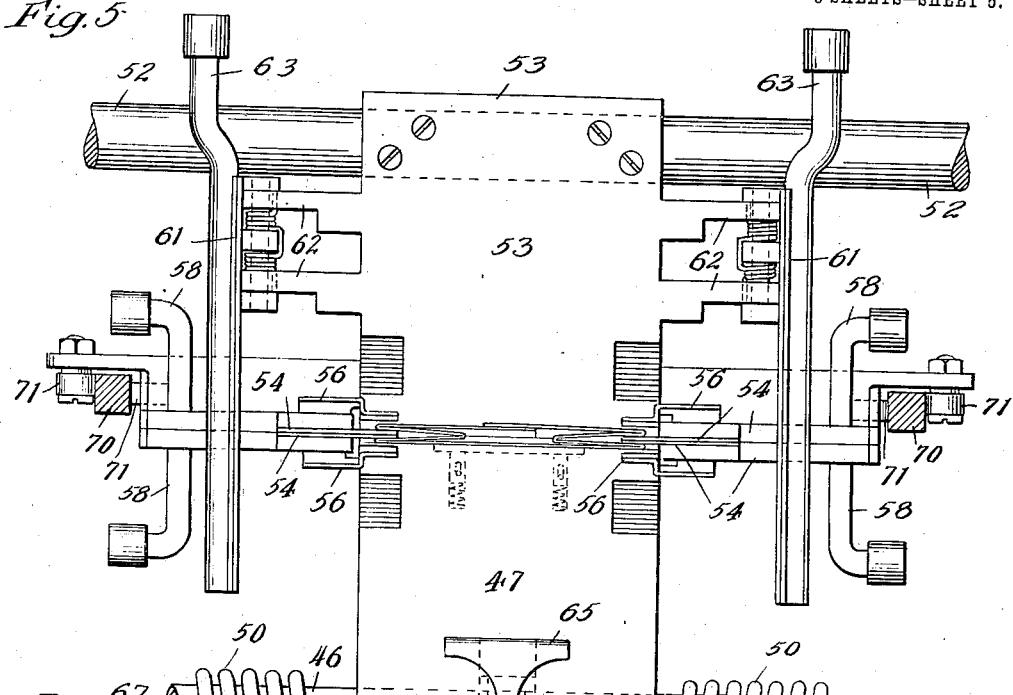
Figure 6:
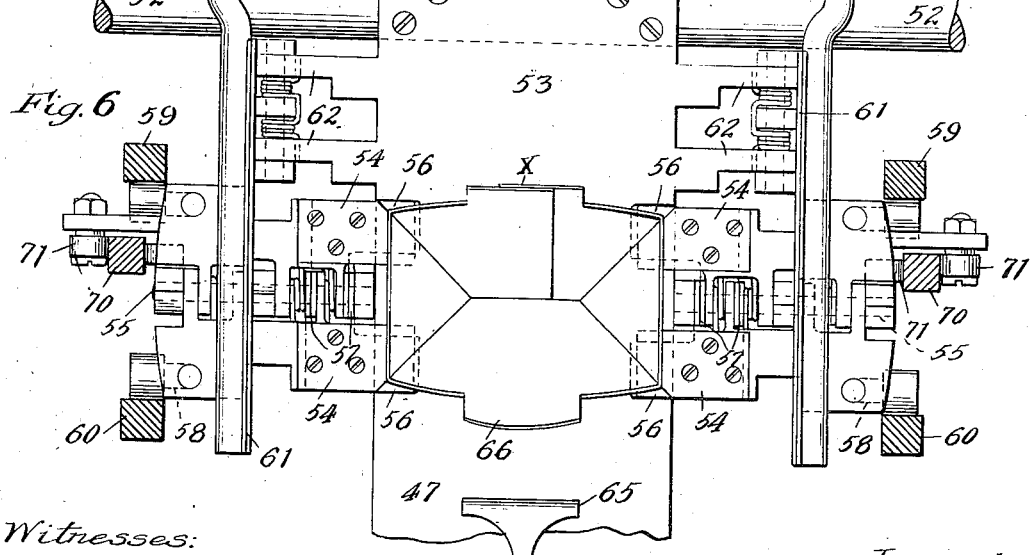
Figure 11:
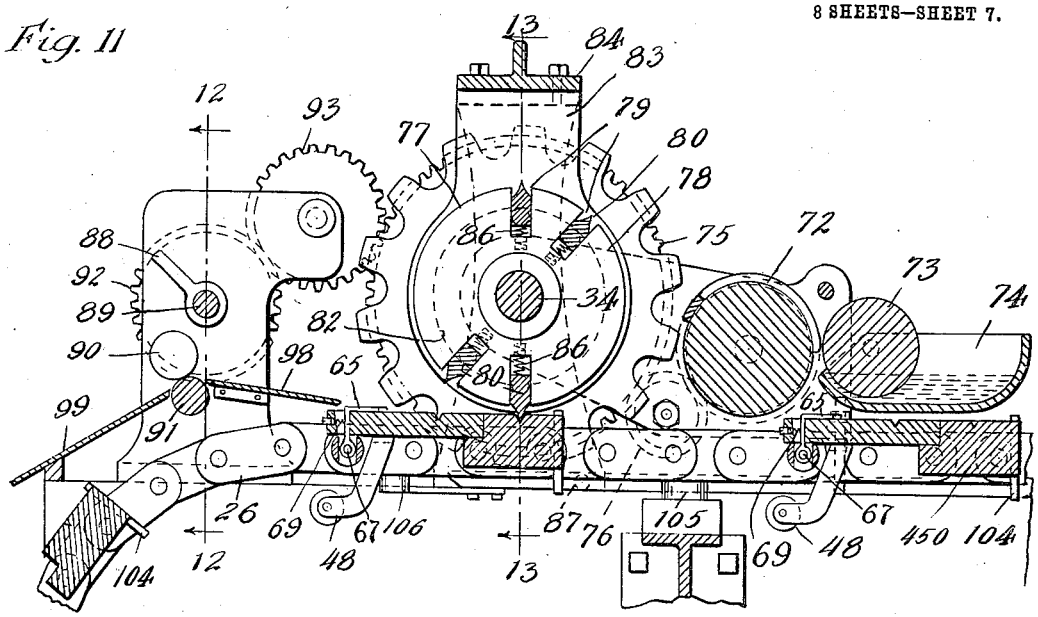
Figure 12:
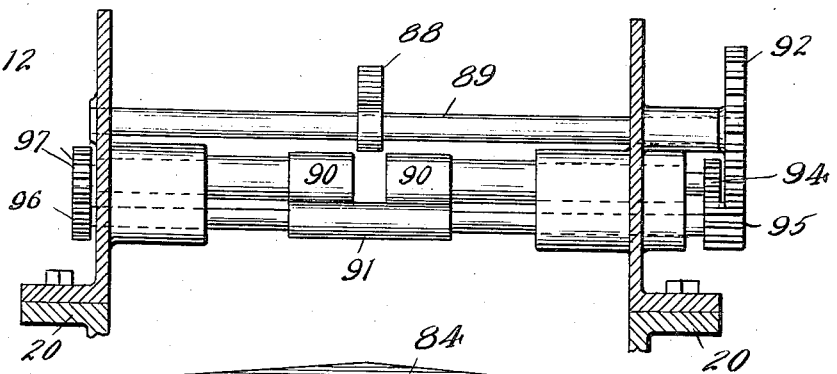
Figure 13:
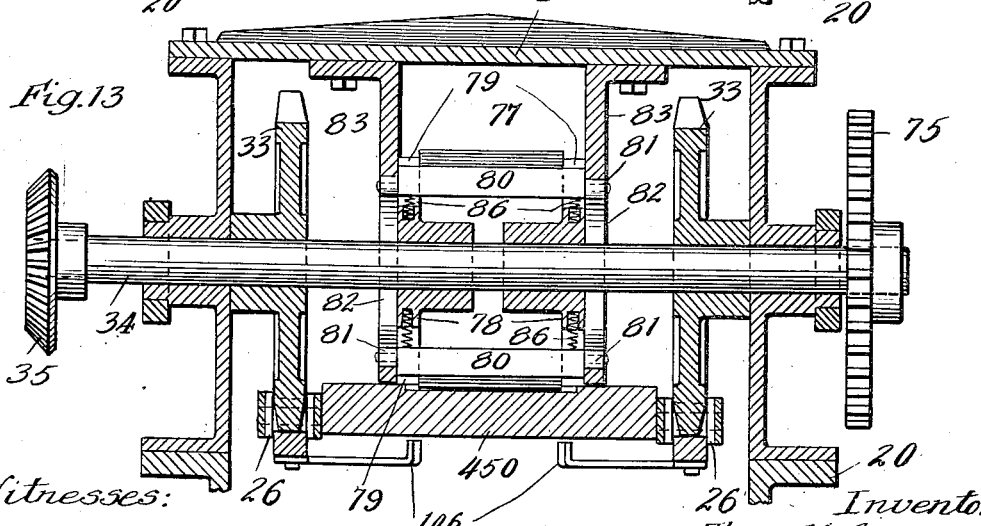

In such drawings, Figure 1 is a side elevation of the machine, Fig. 2 a central vertical section, Fig. 3 a section on the line 3—3 of Fig. 1, Fig. 4 a section on the line 4—4 of Fig. 3. Figs. 5, 6 and 7 are enlarged vertical sections of one of the folding mechanisms showing it in different stages of its operation. Figs. 8, 9, 10 are sections on the lines 8—8, 9—9 and 10—10 respectively of Fig. 7. Fig. 11 is a vertical section of the pasting and creasing devices. Figs. 12 and 13 are sections on the lines 12—12 and 13—13 respectively of Fig. 11. Figs. 14, 15 and 16 are perspective views showing the different stages of the folding operation. Fig. 17 is a perspective view showing the pasting operation.

Referring to said drawing, 20 indicates the side frames, and 21 the pulley driven shaft by which the machine is actuated. This shaft carries a pinion 22 meshing with a gear 23 on shaft 24, which carries sprocket wheels 25 actuating the carrier chains 26 fully described later on. Gear 23 also actuates gears 27 and 28 which carry motion to the gear 29 on shaft 30 carrying sprockets 31 actuating the carrier chains 32, also described later on. The chains 26 actuate sprockets 33 on a shaft 34, carrying the creaser described below, and shaft 34 carries a bevel pinion 35 meshing with another gear 36 on a longitudinally arranged shaft 37, having a bevel pinion 38 at its farther end driving a second pinion 39 on the journal 40 of the lower one of a pair of feed rolls 41, having intermeshing gears 42 whereby the lower roll drives the upper one. These rolls receive the flattened tubular paper blanks X from which the bags are formed, and feed to the holding mechanism of the machine, passing them first between small pressure rolls 43 driven by suitable gearing shown at Fig. 2, from the lower feed roll 41.

The feed chains 26 are supported and actuated at one end of the machine by the sprocket wheels 25, and at the other end they ride upon wheels 44, the shaft 45 of which is adjustable as shown at Fig. 1 to permit the taking up of the stretch of the chains. The chains are united at intervals by cross bars 450 and rock shafts 46, upon each of which shafts is mounted a flat plate 47 provided with an arm 48 adapted when it encounters a stationary cam 49 to rock the shaft and thus swing the plate from its normal position in which it is parallel to the chains, to an upright or vertical position, at right angles to the plane of the chains. The plates continue in this raised condition so long as their arms 48 remain on cam 49 and swing back to normal position as soon as the arms have passed off the cam, under the power of springs 50. Three of the plates are shown as thus raised in Fig. 2.

The upper chains 32 ride upon the sprocket 31 at one end and upon a second sprocket 51 at the other end, and although shorter than chains 26, they move at the same speed therewith, and carry portions of the folding mechanisms which coact with the portions carried upon chains 26 as will now be seen. They are connected to each other at suitable intervals by cross bars 52 to each of which is rigidly attached a plate 53 in a vertical position relative to the chains. The plates 53 come into register with the plates 47 of the lower chains, as plainly shown at Figs. 2, 5, 6 and 7, and together they form a flat surface against which some of the folding operations may take place, while at the same time their edges clamp the bag blank far enough back from its advance end to permit the formation of the box bottom in that portion in front of the plates. Each plate 53 has lateral arms 53ª, one on each side, and on these arms are hollow castings 53ᵇ capable of sliding but prevented from turning by keys 53ᵈ let into key ways 53ᶜ and held on the arms by set screws 53ᵉ. A pair of folding blades 54 is provided at each side of the machine, and each pair is hinged upon a pivot 55 supported from one of the castings 53ᵇ as seen at Figs. 9 and 10, the blades being independent of each other and turning in opposite directions away from each other. In their normal positions the blades stand horizontally side by side and close together as best seen at Figs. 5 and 14, to adapt them to enter the longitudinal side folds of the bag blank, as shown at Fig. 14. After being thus entered in the side folds, the blades are turned in diverging directions on their axis from the position of Figs. 5 and 14 to that of Figs. 6 and 15. In this change they assume vertical positions, parallel to the plates 47 and 53, and also move bodily away from each other, as shown, and in so doing they open the end of the bag into the open box form seen at Figs. 6 and 15 and form the diamond folds therein, being assisted in so doing by spring clamping devices 56, attached one to the outside of each blade and having wings 57 encircling the pivot 55. The diverging movements of the blade causes them to push the folds against the spring clamps, the latter being in positions on the outside of the folds, and coacting with the blades in retaining control of the paper until the open box has been formed.

The blades are actuated in giving the box form to the bag as follows: Each blade carries an arm 58, armed with an anti-friction roller, and of said arms, those which are uppermost when the blades are engaged with the bag, encounter and are swung by cam tracks 59, and those which are lowermost by cam tracks 60. Through the tracks and arms, the blades are opened or spread as already stated, and they retain their changed positions until withdrawn laterally as described below. While the blades are holding the bag in the open box condition, a pair of side wings 61, pivoted in lateral projections 62 upon the plate 53 and normally positioned at right angles to the plates, are caused to swing toward each other and down flatwise upon the plate, thereby flattening the box and putting it into position for pasting. The wings 61 are actuated in this position as follows: Each of the wings has a projecting arm 63, provided with an anti-friction roller, and said rollers while the supporting plate 53 is moving through the lower portion of its path, each come in bearing with the side faces of one of the long cams 64, best shown at Fig. 4, and are by such cams forced toward each other until the wings have completed their operation, as seen at Fig. 3.

As soon as the box sides have been bent down by wings 61, the clip 65 with which each plate 47 is furnished is forced down upon the flap 66 of the bag and clamps it to the plate. This clip is opened by a rod 67 entering the shaft 46 axially, and having an arm at right angles as seen at Fig. 3, such arm being tripped in the movement of the chains by pins 68 and 87 secured in the side frame of the machine. The tripping rocks the rod and causes the clip which has a right angle base portion made fast on the rod 67 to open so the flap may position itself on the plates and it closes upon the flap as soon as the pin has been passed, being impelled by its spring 69 which presses upon said base portion. This operation will be fully understood from Figs. 7 and 11 where the clip is fully shown. A second pin 87 releases the bag.

The wings 61 are required to maintain pressure on the bag but a short time, and the cams 64 therefore recede from each other as at Fig. 4, and allow the wings to gradually resume their normal positions, they being furnished with springs encircling their pivots, for causing their return. The diamond folders 54 while acting move in a plane nearer the central longitudinal line of the machine, than while moving idly through the remainder of their path, and they are shifted in and out by cams 70, plainly indicated in Fig. 4, the folders being slidably supported on their carrying plates and having extensions to which companion rollers 71 are attached, one roller upon each side of each cam. The cams are adapted thus to move the folders first in toward the work, and later after they have performed their office, to move them out again to their non-working plane. By this feature I avoid interference by the diamond folders with the wing folders. In consequence of this lateral shifting of the diamond folders, the cam tracks 59 and 60 are made double width for a portion of their length as shown in Fig. 4 in order that they may continue their control of the folders after the latter have been shifted outwardly.

After the folding operations so far described have been completed, and the clip 65 has seized the flap 66, the plate 47 swings down from its upright to its normal position under power of the spring encircling its pivot as soon as its arm 48 has moved off the cam 49. By this time the folders have all released the bag, so that the clip now takes control of it and carries it down in this change of position of the plate into line with the pasting devices. The chain 26 which continues its horizontal movement past the pasting, creasing and final folding mechanisms, now carries the bag first under the pasting roller 72 best shown at Fig. 11 which is supplied with paste by the feed roller 73 rotating in the paste dish 74. The roller 73 is rotated from the sprocket 33 and shaft 34 by gear 75, and intermediate 76. The creaser 77 is carried on shaft 34 and consists of two disks 78 rotating with the shaft and having radial slots 79 in which are placed creaser blades 80. The ends of the blades have projecting rollers 81 which ride on cams 82 formed in the depending brackets 83 located at either end of the creaser, and supported from the top of the creaser frame 84. The cams 82 are interrupted at the proper point to allow the blades to move downward, and act on the bag as plainly illustrated in the case of the lowermost blade in Fig. 11. The plates 47 and their accompanying blocks 45 are notched out as plainly appears in said figure, to give the blades opportunity to form the crease. The motive power for the creasing is furnished by the springs 86 pressing outward upon the ends of the blades. Two of the blades operate upon each bag, and crease the bottoms transversely and after operating are lifted by the cams. Preparatory to the creasing operation the clip 65 is lifted by a second pin 87, similar to pin 68, and located as shown at Figs. 2 and 11 so that both the flap ends are then free to be folded over on to the central part of the bottom. The creaser leaves the ends in such condition that they will be laid over one on top of the other on the central portion, by the flipper 88 upon the shaft 89 and the pressure rollers 90 and 91. The shaft 89 is rotated by its gear 92 and the intermediate 93 from the gear 75 and in order to avoid interference with roller 90 by the flipper, said roller is made in two parts or sections, each having its own bearing, and its own actuating means. Thus one part of the roller is operated by pinion 94 meshing with pinion 95 on the shaft of roller 91 and taking power from gear 92, while the other part of roller 90 is operated by pinions 96 and 97, the former upon the shaft of roller 91. In approaching the rollers 90 and 91 the bag moves over a platform 98, and after passing the rollers slides down a table 99 onto a conveying belt 100 and are carried into the bight of that belt and a second similar belt. The rollers 90 and 91 complete the bag.

In order to render gradual the return to normal positions of the folding blades 54, guiding frames 101 located as shown at Fig. 2 are provided for each pair of the blades. These frames act upon the arms 58, or the rollers carried upon such arms. The springs 103 act outwardly upon the rollers 71 by which in conjunction with the cam tracks 70 the diamond folders are moved outwardly from their acting plane, and maintain them in said outward plane while they are moving through the upper or idle portion of their travel.

At 104 in Figs. 3 and 17 are two spring nippers mounted upon each cross bar 450. They are adapted to take hold of the edge of the body of the bag, and are pivoted on the cross bars 450 held in acting position by springs as shown. They are raised to allow them to nip the bag by stationary cams after the bag has passed into the control of plates 47 and of the clips on such plates, and they are also raised to release the bag after it has been creased, so as to pass between the pressure rolls 90 and 91. The cams referred to for thus operating the nippers are shown in pairs at 105 and 106 (see Fig. 13).

By mounting the folding devices on endless chains as shown, I am enabled to form bags with great rapidity, and at the same time giving the individual folder devices very deliberate speed. This result is due to the fact that the chains permit a considerable number of bags to be in process of manufacture at the same time.

In order to insure the proper entry of the folder blades 54 in the plaits of the bag, I provide two opener strips 107, (see Figs. 1, 2 and 4). These openers are simply two narrow, thin stationary strips which remain in the side plaits and hold them slightly open until the folder blades have entered the plaits.

The operation of the machine is fully detailed in the foregoing description.

I claim:—

1. The machine for forming bottoms of self opening square paper bags, wherein are combined two parallel endless carriers, each formed of two endless chains, each carrier provided with means coacting with means upon the other carrier to hold the bag blanks and to form folding beds, and diamond fold devices mounted on one of said carriers.

2. The machine for forming bottoms of self opening square paper bags, wherein are combined two parallel endless carriers, each comprising two endless chains, supporting wheels having parallel axes, upon which said chains are mounted said carriers being provided with coacting means for holding the bag blanks while the folding devices act on them, and folding devices carried by said carriers.

3. The paper bag machine having two endless carriers, one above the other, each embodying a pair of endless chains, the upper pair carrying devices for folding the bottom and including a plate forming part of the folding bed, and the lower pair carrying a hinged plate which is raised to a vertical position during the folding operations, a cam for raising said plate and a spring for depressing it.

4. The paper bag machine wherein are combined parallel carriers, one above the other, each comprising two pairs of endless chains and supporting wheels for the same, each carrier supporting a portion of the folding bed, and the lower portion being hinged so it may be raised to a vertical position during the folding, means for operating said hinged portion, and folders moving with the carriers.

5. The paper bag machine wherein are combined parallel carriers, one above the other, each comprising two pairs of endless chains and supporting wheels for the same, the upper carrier having a stationary plate forming part of the folding bed, the lower carrier having a hinged plate also forming a part of the folding bed, means for operating said hinged plate, and means for folding the blanks; said bed plates supporting the bag blanks during the folding operations, and said hinged plate rising to an upright position to receive fresh blanks and falling to position them for pasting.

6. The paper bag machine wherein are combined parallel carriers, one above the other, each comprising two pairs of endless chains and supporting wheels for the same, the upper carrier having a stationary plate forming part of the folding bed, the lower carrier having a hinged plate also forming a part of the folding bed, means for operating said hinged plate and means for folding the blanks, said bed plates supporting the bag blanks during the folding operations, and said hinged plate rising to an upright position to receive fresh blanks and falling to position them for pasting, and a paste roller acting on the folded blank.

7. The paper bag machine wherein are combined two endless parallel carriers carrying plates adapted to register with each other and form a vertical folding bed, and to support the blank between them, one of said plates being hinged and adapted to position the blank for pasting, means for operating said hinged plate and a pasting roller.

8. The paper bag machine wherein are combined two endless parallel carriers carrying a series of folding mechanisms, such folding mechanisms embracing registering plates, a part of which is upon each carrier and such plates being adapted, when brought together, to form vertical folding beds and to support the blanks while being operated upon, means for opening the blanks into box form, and means for folding them.

TRUE M. AVERY.

Witnesses:
W. E. CREATH,
E. S. CARLSON.